United States Patent [19]

Amata

[11] Patent Number: 4,795,267
[45] Date of Patent: Jan. 3, 1989

[54] CALORIMETER USING REMANENCE TYPE ELECTROMAGNETIC FLOWMETER

[75] Inventor: Yoshitaka Amata, Yokkaichi, Japan

[73] Assignee: Aichi Tokei Denki, Co., Ltd., Nagoya, Japan

[21] Appl. No.: 8,232

[22] Filed: Jan. 29, 1987

[30] Foreign Application Priority Data

Jan. 31, 1986 [JP] Japan .................................. 61-20915

[51] Int. Cl.$^4$ .......................................... G01K 17/06
[52] U.S. Cl. ........................................ 374/41; 374/31; 374/142; 73/861.17
[58] Field of Search ...................... 374/31, 40, 41, 142, 374/152; 73/861.17

[56] References Cited

U.S. PATENT DOCUMENTS

| | | | |
|---|---|---|---|
| 3,552,207 | 1/1971 | Monk et al. ............................. | 374/31 |
| 3,842,669 | 10/1974 | Iversen .................................. | 374/41 |
| 3,967,492 | 7/1976 | Allington ............................... | 374/31 |
| 4,337,655 | 7/1982 | Sundstom et al. ..................... | 374/41 |
| 4,409,846 | 10/1983 | Ueno .................................... | 73/861.17 |
| 4,601,209 | 7/1986 | Alata .................................... | 73/861.17 |

FOREIGN PATENT DOCUMENTS 0645074 5/1937 Fed. Rep. of Germany .
906509 9/1977 Japan .

*Primary Examiner*—William A. Cuchlinski, Jr.
*Assistant Examiner*—Thomas B. Will
*Attorney, Agent, or Firm*—Pollock, Vande Sande & Priddy

[57] ABSTRACT

A calorimeter using a remanence type electromagnetic flowmeter includes a core made of a semi-hard or hard magnetic material and having a property in which a remanent magnetic flux density is varied in proportion to a temperature, a coil excited intermittently to magnetize the core, a metallic pipe forming a fluid path, a yoke for conducting remanent magnetic flux of said core, the yoke being fixed to the outer surface of the metallic pipe in close contact therewith without forming an air gap therebetween, and a pair of electrodes attached to the inner surface of the metallic pipe through an insulator.

6 Claims, 2 Drawing Sheets

CALORIMETER USING REMANENCE TYPE ELECTROMAGNETIC FLOWMETER

BACKGROUND OF THE INVENTION

The present invention relates to a calorimeter, and in particular, to a calorimeter using a remanence type electromagnetic flowmeter.

A calorimeter composed of three sections including a section for measuring a flow rate of a fluid which is a heat transfer medium, a section for measuring a temperature of the fluid, and a computing section for multiplying a volume of the fluid measured in the flow rate measuring section by the temperature of the fluid measured in the temperature measuring section is known from Japanese Pat. No. 906509.

In the prior art calorimeter, since it is composed of three sections including the flow rate measuring section, the temperature measuring section, and the computing section, there is a problem in that the structure is complicated and the costs are high.

SUMMARY OF THE INVENTION

A calorimeter in accordance with the present invention is designed to obtain an induced voltage proportional to an amount of heat directly from a pair of electrodes by utilizing a phenomenon in that a remanent magnetic flux density applied to a fluid path of an electromagnetic flowmeter is proportional to a temperature of the fluid. Accordingly, a calorimeter which is simple in the structure and low in the manufacturing costs can be obtained.

In the present invention in order to solve the aforemention problem, a calorimeter using a remanence type electromagnetic flowmeter is provided with a core made of a semi-hard or hard magnetic material, a coil intermittently excited to magnetize the core, and a yoke for conducting remanence of the core to a metallic pipe forming a fluid path, and wherein the core has a property in which remanent magnetic flux density is varied in proportion to a temperature, and an end surface of the yoke is fixed to an outer surface of the metallic pipe in close contact therewith without forming an air gap therebetween.

In the remanence type electromagnetic flowmeter, when the fluid which is a heat transfer medium flows in the metallic pipe, an induced voltage proportional to the product of the flux density in the fluid path and the flow rate of the fluid is generated in the pair of electrodes of the electromagnetic flowmeter. The heat of the fluid is conducted from the metallic pipe to the core via the yoke, and the temperature of the core becomes the same temperature as the fluid, and the remanence flux density applied to the fluid path is varied in proportion to the fluid temperature. As a result, the induced voltage proportional to the product of the fluid flow rate and the fluid temperature is generated in the pair of electrodes of the electromagnetic flowmeter.

This induced voltage is proportional to the amount of heat of the fluid which is a heat transfer medium.

DESCRIPTION OF THE PREFERRED EMBODIMENTS

Figure 1:
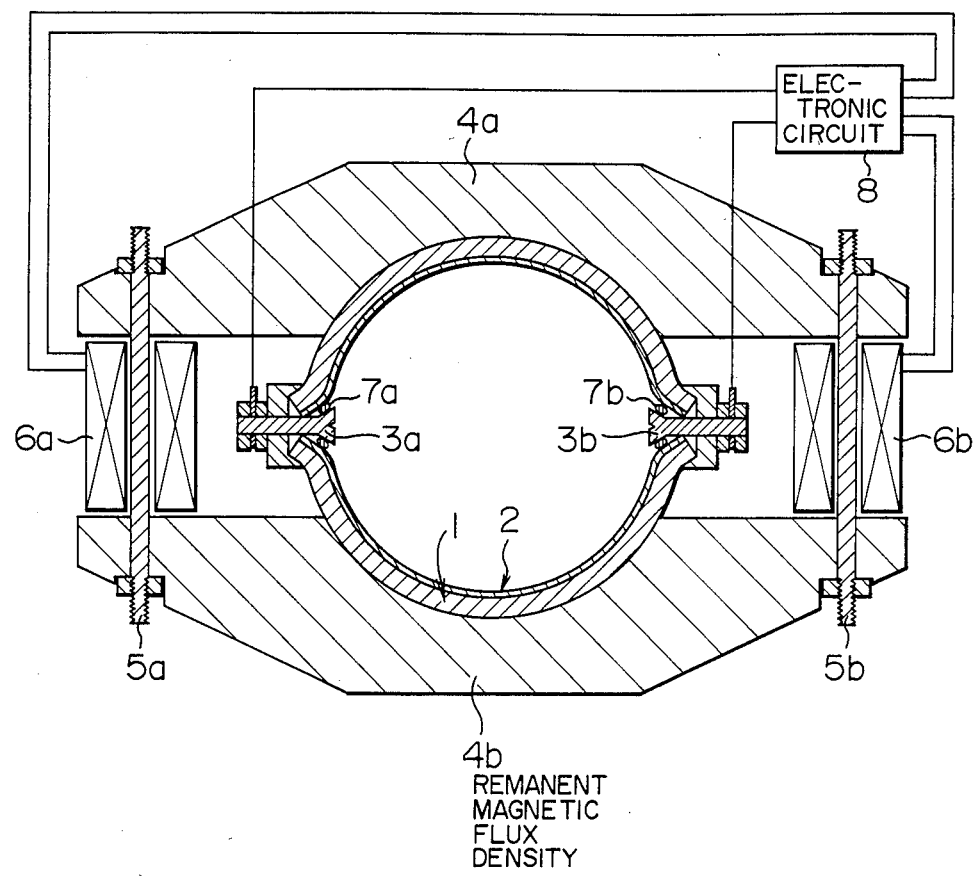
FIG. 1 is a transverse sectional view showing a part of an embodiment of the present invention.

In FIG. 1 illustrating an embodiment of the present invention, the reference numeral 1 designates a metallic pipe of a non-magnetic material constituting a fluid path, and a fluid which is a heat transfer medium flows through the metallic pipe 1. The reference numeral 2 designates an insulating lining formed on the inner surface of the metallic pipe 1, 3a, 3b electrodes, 4a, 4b yokes, 5a 5b cores made of a semi-hard or hard magnetic material, and the cores 5a, 5b are respectively wound with exciting coils 6a, 6b. End surfaces of the yokes 4a, 4b constituting a magnetic circuit are fixed to the outer surface of the metallic pipe 1 in close contact therewith so that no air gap is formed therebetween as shown in FIG. 1. This fixing is carried out by securing nuts fitted to opposite ends of each of the cores 5a, 5b.

The reference numerals 7a, 7b designate packings for electrically insulating the electrodes 3a, 3b from the metallic pipe 1 and also for sealing therebetween. The coils 6a, 6b are intermittently excited by an exciting current from an electronic circuit 8, and a voltage which is proportional to the product of a remanent magnetic flux density applied to the fluid path due to the remanence of the cores 5a, 5b during the exciting current is zero, a fluid flow rate is induced in the electrodes 3a, 3b.

Such operation of the so-called remanence type electromagnetic flowmeter in which the core is magnetized by supplying the exciting current to the coils intermittently, and the fluid flow rate is measured by the remanence after the exciting current is interrupted is well known, for example, from U.S. Pat. No. 4,409,846.

In the present invention, the cores 5a, 5b have a property in which the remanent magnetic flux density is varied in proportion to a temperature.

Figure 2:
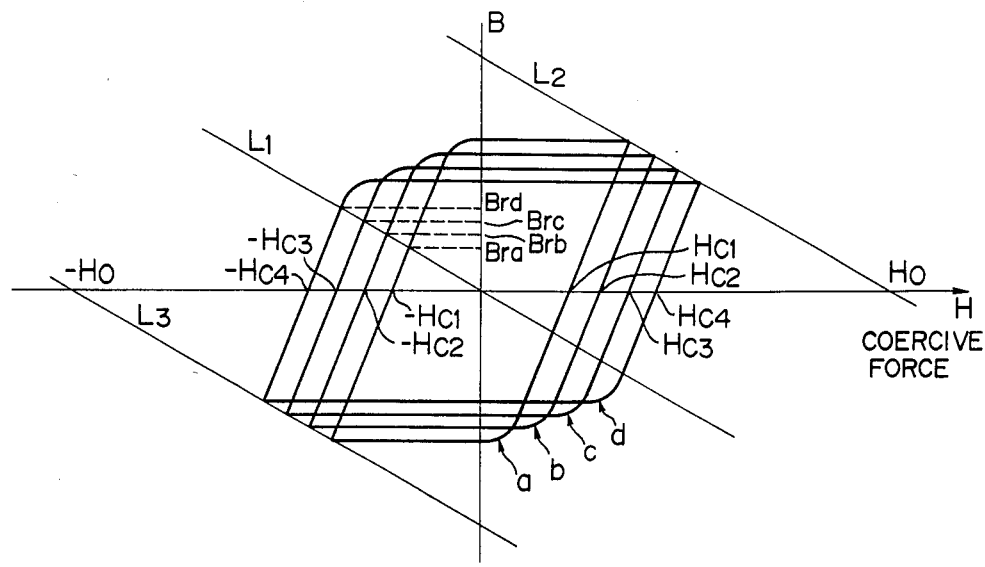
FIGS. 2 and 3 are graphs showing characteristics of a magnetic circuit in the embodiment of the present invention.

FIG. 2 shows B-H curves of such cores 5a, 5b. In FIG. 2, the B-H curves designated by a, b, c, and d are obtained respectively at temperatures $T_1$, $T_2$, $T_3$, and $T_4°$ C, and differences in the temperatures $T_1$, $T_2$, $T_3$, and $T_4$ are in a relationship $T_1 < T_2 < T_3 < T_4$. A coercive force of each B-H curve is represented by $H_{c1}$, $H_{c2}$, $H_{c3}$, and $H_{c4}$, and an amount of change in the coercive force is proportional to a change in temperature. A straight line $L_1$ is a performance line of the magnetic circuit, and the gradient of the line $L_1$ is principally dependent on a magnitude of a magnetoresistance of the magnetic circuit, and a length and a sectional area of the magnetic material.

First, at the temperature $T_1°$ C, after exciting according to the line $L_1$ up to $H_0$ of $L_2$, the excitation is interrupted, and next, after exciting up to $-H_0$ of $L_3$, the excitation is interrupted. In this manner, by repeating the excitation alternately in the opposite directions intermittently, the B-H curve of a is developed. And the flux density B at the intersection of the B-H curve of a and the straight line (performance line) $L_1$ represents a remanent magnetic density $B_{ra}$. When the temperature rises to $T_2°$ C and the coercive force becomes $H_{c2}$, by applying the excitation of $H_0$ and $-H_0$ alternately and intermittently, the B-H curve of b is obtained, and the remanent magnetic flux density becomes $B_{rb}$. Further, when the temperature rises to $T_3$, $T_4°$ C and the coercive force of the core becomes $H_{c3}$, $H_{c4}$, similarly, the B-H curves of c, d are obtained, and the remanent magnetic flux density varies to $B_{rc}$, $B_{rd}$. When the temperature is T°C, the remanent magnetic flux density $B_r$ is expressed by $$B_r = B_{ra} + \frac{B_{rb} - B_{ra}}{T_2 - T_1}(T - T_1) \quad (1)$$

and, if $B_o$ and $A_o$ represent $$B_o = \frac{B_{ra}T_2 - B_{rb}T_1}{T_2 - T_1}, \text{ and}$$

$$A_o = \frac{B_{rb} - B_{ra}}{B_{ra}T_2 - B_{rb}T_1},$$

then the remanent magnetic flux density $B_r$ is expressed by $$B_r = B_o(1 + A_o T) \quad (2),$$

and, it is seen that $B_r$ is varied in proportion to the temperature T.

Also, the $A_o$ in the formula (2) can be changed by selecting a magnetic material and by changing the gradient of the performance line $L_1$.

Because of the fact that the remanent magnetic flux density B of the fluid path is proportional to the remanent magnetic flux density $B_r$ in the formula (2), if the proportional constant is k, then B i expressed by $$B = kB_r = kB_o(1 + A_o T) \quad (3).$$

Assuming that a distance between the electrodes is D, and an average velocity is $\bar{v}$, the voltage e induced in the electrodes is expressed by $$e = D\bar{v}B = D\bar{v}kB_o(1 + A_o T) \quad (4).$$

Supposing that the amount of heat passing the fluid path for a time of $\Delta t$ is $\Delta Q$, the mass of the fluid which is the heat transfer medium is $\Delta M$, the specific heat is C, and the temperature at this time is T° C, then $$\Delta Q = \Delta M \cdot C (T_0 + T)$$

where, $T_0$ is 273.15[K].

Further, supposing that the sectional area of the fluid path is S $$\Delta M = S v \Delta_t, \text{ and} \quad (5)$$
$$\Delta Q = S v \Delta_t \cdot C \cdot (T_o + T)$$
$$= S \cdot C \cdot T_o \cdot \bar{v}\left(1 + \frac{T}{T_o}\right)\Delta T$$

By obtaining $\bar{v}$ from the formula (4) of the induced voltage e, and by substituting in the formula (5), $$\Delta Q = \frac{SCT_o}{DkB_o} \cdot \frac{\left(1 + \frac{T}{T_o}\right)}{(1 + A_o T)} e\Delta_t \quad (6)$$
$$= K \frac{\left(1 + \frac{T}{T_o}\right)}{(1 + A_o T)} e\Delta_t$$

where, K is $SCT_o/DkB_o$ and it is a constant.

Since it is possible to change $A_o$ in the formula (2) by changing the gradient of the performance line $L_1$ by selecting a magnetic material, if the magnetic material is selected so that $$A_o = 1/T_o = 1/273.15,$$

then the formula (6) is expressed by $$\Delta Q = Ke\Delta_t.$$

Accordingly, the amount of heat Q is expressed by $$Q = K \int e \cdot d_t$$

and Q is proportional to an integrated value of the voltage induced in the electrodes.

Figure 3:
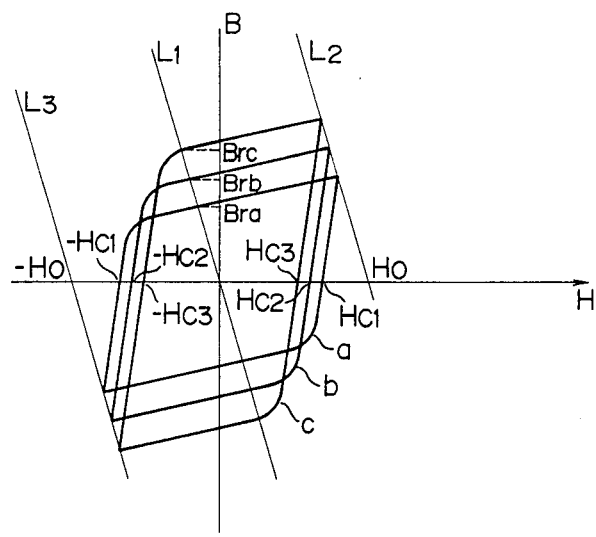

In the embodiment described in the foregoing, as a material for the cores, the material is used in which the coercive force $H_c$ becomes large when the temperature rises as shown in FIG. 2. However, a natural may also be used in which as shown in FIG. 3 the coercive force $H_c$ is decreased in proportion to a change in temperature as the temperature rises. In this case, as compared with the case in FIG. 2, the gradient of the performance line $L_1$ is increased, so that remanent magnetic flux densities of B-H curves a, b, c corresponding to temperatures $T_1 < T_2 < T_3$ are in a relationship $B_{ra} < B_{rb} < B_{rc}$. And it is possible to make a change in the remanent magnetic flux $B_r$ proportional to a change in the temperature.

The core may be made of;
(I) Iron-Cobalt type alloys
   (i) iron-cobalt-chromium
   (ii) iron-cobalt-niobium
   (iii) iron-cobalt-manganese
(II) Alminum-Nickel type alloys
   (i) iron-cobalt-nickel-aluminum
   (ii) iron-nickel-aluminum
(III) Iron-Copper type alloys
   (i) iron-copper
   (ii) iron-copper-manganese Since the remanent magnetic flux density applied to the fluid path of the electromagnetic flowmeter is a value proportional to the temperature, the induced voltage proportional to the amount of heat can be obtained directly in the electrodes. Further, since the thermal resistance between the fluid and the core is small, the induced voltage is accurately responsive to the temperature of the fluid. Accordingly, a calorimeter having a simple structure can be provided at low cost.

I claim:

1. A calorimeter using a remanence type electro-magnetic flowmeter comprising:
a metallic pipe forming a path for heat transferring fluid;
a closed magnetic circuit including:
a core made of a semi-hard or hard magnetic material, said core material having a property in which a remanent magnetic flux density is varied in proportion to a temperature change;
a coil excited intermittently to magnetize said core;
a yoke fixed to the outer surface of said metallic pipe in close contact therewith without forming an air gap therebetween, said yoke conducting remanent magnetic flux of said core to said pipe and a heat of said fluid to said core for varying said remanent magnetic flux density in proportion to the temperature of said fluid; and
a pair of electrodes attached to the inner surface of said metallic pipe through insulators for detecting an induced voltage proportional to the amount of said heat.

2. A calorimeter according to claim 1 wherein said core is made of the magnetic material in which a coercive force is increased as the temperature rises.

3. A calorimeter according to claim 1 wherein said core is made of the magnetic material in which a coercive force is decreased as the temperature rises.

4. A calorimeter according to claim 1, wherein said core is made of iron-cobalt type alloys.

5. A calorimeter according to claim 1, wherein said core is made of aluminum-nickel type alloys.

6. A calorimeter according to claim 1, wherein said core is made of iron-copper type alloys.

* * * * *